(12) United States Patent
Golda (10) Patent No.: US 12,270,446 B2
(45) Date of Patent: Apr. 8, 2025

(54) COMPRESSOR ASSEMBLY, AIR SUPPLY UNIT

(71) Applicant: ZF CV Systems Europe BV, Brussels (BE)

(72) Inventor: Katarzyna Golda, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 42 days.

(21) Appl. No.: 18/177,542

(22) Filed: Mar. 2, 2023

(65) Prior Publication Data

US 2023/0234546 A1     Jul. 27, 2023

Related U.S. Application Data

(63) Continuation of application No. PCT/EP2020/074384, filed on Sep. 2, 2020.

(51) Int. Cl.
*B60T 17/02*     (2006.01)
*B60T 17/00*     (2006.01)
(Continued)

(52) U.S. Cl.
CPC ............ *F16F 15/04* (2013.01); *B60T 17/002* (2013.01); *B60T 17/02* (2013.01); *F04B 39/0044* (2013.01)

(58) Field of Classification Search
CPC .... B60T 17/02; B60T 17/002; F04B 39/0044; F04B 39/0027; F16F 15/04; F16F 15/0232; F16F 9/05; F16F 9/084; F02B 67/10
See application file for complete search history.

(56) References Cited

U.S. PATENT DOCUMENTS 4,325,541 A * 4/1982 Korosladanyi ........ B60G 17/04
                                                    280/124.101
5,964,579 A * 10/1999 Tang .................... F04B 39/0044
                                                    417/363
(Continued)

FOREIGN PATENT DOCUMENTS

CA       2 264 401 A1    11/1999
CN       203879703 U     10/2014
(Continued)

OTHER PUBLICATIONS

International Preliminary Report on Patentability and Written Opinion of the International Searching Authority dated Jun. 2, 2021 for international application PCT/EP2020/074384 on which this application is based.
(Continued)

*Primary Examiner* — Dominick L Plakkoottam
(74) *Attorney, Agent, or Firm* — Walter Ottesen, P.A.

(57) ABSTRACT

The disclosure relates to a compressor assembly for an air supply unit of a vehicle. The compressor assembly includes: a compressor for providing pressurized air and having a compressor housing, at least one mounting bracket, wherein the at least one mounting bracket is fixed to the compressor housing, and, for each mounting bracket, one bearing for connecting the compressor assembly to a housing structure of the air supply unit. The bearing includes a flexible, hollow bellow, adapted to receive a gaseous medium, wherein the bellow includes at least one mounting feature, in particular recess, adapted to receive the mounting bracket, and the bellow is adapted to be pneumatically charged from an unpressurized state into a pressurized state, wherein the mounting feature is adapted to mechanically connect the bellow to the mounting bracket in a pressurized state via a positive lock.

20 Claims, 3 Drawing Sheets

(51) Int. Cl.
*F04B 39/00* (2006.01)
*F16F 15/04* (2006.01)

(56) References Cited

U.S. PATENT DOCUMENTS

| | | | |
|---|---|---|---|
| 6,217,297 B1 | 4/2001 | Tsumagari et al. | |
| 10,767,639 B2* | 9/2020 | Meissner | H02K 5/15 |
| 2003/0067103 A1* | 4/2003 | Easter | B60G 17/0528 |
| | | | 267/64.11 |
| 2005/0204754 A1* | 9/2005 | Vuillermoz | F04D 29/601 |
| | | | 62/55.5 |
| 2013/0255787 A1 | 10/2013 | Frank et al. | |
| 2016/0121682 A1* | 5/2016 | Leonard | F16F 9/04 |
| | | | 280/124.161 |
| 2017/0219041 A1* | 8/2017 | Debruler | F16F 9/36 |
| 2020/0102947 A1 | 4/2020 | Wichern et al. | |
| 2020/0300332 A1* | 9/2020 | Halladin | F16F 15/0275 |

FOREIGN PATENT DOCUMENTS

| | | | |
|---|---|---|---|
| CN | 205174978 U | 4/2016 | |
| CN | 205401043 U | 7/2016 | |
| CN | 106931684 A | 7/2017 | |
| CN | 104334434 B * | 1/2018 | B61F 5/305 |
| CN | 209484103 U | 10/2019 | |
| CN | 110892156 A | 3/2020 | |
| CN | 211230757 U | 8/2020 | |
| DE | 3819770 A1 * | 12/1989 | |
| DE | 10 2014 208 901 A1 | 11/2014 | |
| DE | 11 2014 005 119 T5 | 7/2016 | |
| EP | 0 904 962 A2 | 3/1999 | |
| JP | 2005048917 A * | 2/2005 | |
| KR | 101512363 B1 * | 4/2015 | |
| KR | 20200003952 A | 1/2020 | |

OTHER PUBLICATIONS

International Search Report of the European Patent Office dated Jun. 2, 2021 for international application PCT/EP2020/074384 on which this application is based.

English translation and Office action of the Chinese Patent Office dated Nov. 27, 2024 for corresponding Chinese patent application 202080103913.X.

Songsong, Z. et al., "Failure analysis and structure improvement on compressor exhaust pipes of bus air conditioner", Refrigeration and Air-Conditioning, No. 2, Mar. 4, 2020, pp. 44-48, together with English translation.

* cited by examiner

COMPRESSOR ASSEMBLY, AIR SUPPLY UNIT

CROSS-REFERENCE TO RELATED APPLICATION

This application claims priority of international patent application no. PCT/EP2020/074384, filed Sep. 2, 2020, the entire content of which is incorporated herein by reference.

TECHNICAL FIELD

The disclosure relates to a compressor assembly for an air supply unit of a vehicle.

BACKGROUND

Compressor assemblies, in particular means for fixation of a compressor in a vehicle, are generally well known. DE 11 2014 005 119 T5 discloses an electric compressor, in which an electric motor, a compression mechanism driven by the electric motor, and an inverter for driving the electric motor are integrated, and which is attached and secured to a vehicle via a support bracket. The support bracket has a compressor-side bracket secured to the bottom part of the electric compressor, a vehicle-side bracket secured to the vehicle, and three elastic members arranged between the brackets. Two of the three elastic members are arranged toward the electric motor from the centroid position of the electric compressor, and the other one is arranged toward the compression mechanism from the centroid position.

U.S. Pat. No. 6,217,297 discloses a compressor assembly for an air supply unit of a vehicle as mentioned in the introduction as a mounting structure of an electric motor-driven compressor applied to a hybrid vehicle having an internal combustion engine and a vehicle electric motor for running the vehicle, the mounting structure including: a compression mechanism for compressing fluid; and a compressor electric motor integrated with the compression mechanism for driving the compression mechanism, wherein the electric motor-driven compressor is mounted on the internal combustion engine in such a manner that the compressor electric motor is positioned closer to the center of gravity of the internal combustion engine than the compression mechanism. In the structure disclosed in U.S. Pat. No. 6,217,297, the compression mechanism is driven by only the electric motor; the compressor electric motor includes an approximately cylindrical stator core, a rotor for rotating in the stator core, and the compression mechanism is driven by only the electric motor; the compressor electric motor includes an approximately cylindrical stator core, a rotor for rotating in the stator core, and a motor housing for housing the stator core and the rotor, and a fixing portion including a bolt hole in which a bolt is inserted to fix the motor housing to the internal combustion engine, and the fixing portion is formed on the motor housing at a position deviated from a part corresponding to the stator core.

Despite these generally favorable approaches of mounting compressors in a vehicle, there is still further potential of improving the mounting characteristics, in particular regarding the reduced transmission of vibrations. It is therefore desirable to address at least one of the above problems.

SUMMARY

It is an object of the disclosure to provide compressor assemblies which are improved with respect to reliable mounting which allows in particular a reduced transmission of vibrations.

In accordance with the disclosure, a compressor assembly is proposed for an air supply unit of a vehicle. The compressor assembly includes: a compressor configured to provide pressurized air and having a compressor housing; at least one mounting bracket fixed to the compressor housing; at least one bearing, wherein, for each of the at least one mounting brackets, the compressor assembly has one of the at least one bearings for connecting the compressor assembly to a housing structure of the air supply unit; the at least one bearing includes a flexible, hollow bellow configured to receive a gaseous medium; the flexible, hollow bellow includes at least one mounting feature configured to receive the at least one mounting bracket; the bellow being configured to be pneumatically charged from an unpressurized state into a pressurized state; and, the at least one mounting feature being configured to mechanically connect the bellow to the at least one mounting bracket in the pressurized state via a positive lock.

A compressor assembly for an air supply unit of a vehicle is proposed, including:

a compressor for providing pressurized air, with a compressor housing, at least one mounting bracket, wherein the at least one mounting bracket is fixed to the compressor housing, for each mounting bracket one bearing, for connecting, in particular dampingly fixing, the compressor assembly to a housing structure of the air supply unit.

In accordance with the disclosure, it is proposed that the bearing includes a flexible, hollow bellow, adapted to receive a gaseous medium, wherein the bellow includes at least one mounting feature, in particular recess, adapted to receive the mounting bracket, and the bellow is adapted to be pneumatically charged from an unpressurized state into a pressurized state, wherein the mounting feature is adapted to mechanically connect, in particular fix, the bellow to the mounting bracket in a pressurized state via a positive lock, in particular create an undercut adapted to prevent a relative movement between the bellow and the mounting bracket in an axial direction.

The disclosure is based on the finding that, it is generally advantageous to provide means for absorption and/or damping of vibration when mounting a compressor assembly to a housing structure of an air supply unit. By providing a bearing that includes a flexible, hollow bellow, adapted to receive a gaseous medium, the bellow acts in the manner of an air spring, significantly absorbing and/or damping vibrations that otherwise would have been transmitted via a conventional bearing from the compressor assembly to the housing structure of the air supply unit and vice versa. Furthermore, in the common case that the air supply unit is part of a vehicle, a transmission of vibrations between the compressor and the vehicle can be reduced advantageously.

According to the disclosure, it was specifically recognized that—since the bellow is adapted to be pneumatically charged to change from an unpressurized state to a pressurized state, wherein the mounting feature is adapted to fix the bellow to the mounting bracket—a reliable, yet easy way of assembly is achieved and the assembly effort and number of required parts for assembly can advantageously be reduced.

The term 'positive lock' is used to describe—despite the elastic flexibility of the bellow—the mounting feature's property of restraining movement of the mounting bracket relative to the bellow, in particular in an axial and/or radial direction.

In accordance with a further embodiment, a fixation feature is proposed, adapted to mechanically connect the bellow to the housing structure of the air supply unit. In particular, the fixation feature includes one or more mechanical components, in particular a screw or the like threaded component, for creating a force, in particular a compression force, for fixing the bellow to the housing structure of the air supply unit. By applying a screw or the like threaded component, a refastenable connection can advantageously be achieved.

Preferably, a mounting assembly is proposed with a mounting screw, in particular with a mounting nut, adapted to exert an axial compression force to the bellow or a bellow skin of the bellow by fastening the mounting screw and/or the mounting nut. In embodiments, a mounting assembly can include a mounting screw and a mounting nut which are adapted to engage to each other and exert a compression force in an area between a mounting screw head of the mounting screw and the mounting nut.

It is preferably suggested that the mounting assembly is part of the fixation feature and adapted to charge the bellow from an unpressurized state into a pressurized state. By applying a compression force, the mounting assembly is adapted to increase the pressure acting on a bellow, charging the bellow from an unpressurized state to a pressurized state, with the consequence that at least one mounting feature, in particular recess, will form out to hold a mounting bracket of the compressor assembly in a positively locking manner. The charging process can be considered completed once a certain distance between the mounting screw head and the mounting nut, or a certain (decreased) axial extension of the bellow has been reached by fastening the mounting assembly.

It is preferably suggested that the mounting assembly is part of the mounting feature and adapted to clamp the bellow skin via a force closure, in particular sealingly clamp, the bellow skin at a clamping orifice located in the mounting feature. By applying a compression force, the mounting assembly is adapted to hold the bellow skin, in particular in between a mounting screw head and the mounting nut, resulting in a force closure, fixing the mounting assembly to the bellow. Also, in particular if the bellow features a clamping orifice, the force closure of the mounting assembly can have a sealing function, preventing air to escape from an inner bellow space of the bellow.

In accordance with a further embodiment, it is proposed that the mounting assembly includes at least one mounting screw washer adapted to distribute the compression force on the bellow in particular on a bellow end face of the bellow. One or more washers can be inserted on the mounting screw in between the mounting screw head and the mounting nut for a better distribution of the compression force. Such washers are particularly advantageous for bellows of an air tight kind, where a compression force leads to a charging into the pressurized state.

In accordance with a further embodiment, it is proposed that the bellow is air tight. Such air tight bellow has the advantage of requiring relatively little assembly and operation effort, since no pressure supply is required for charging the bellow into a pressurized state.

It is preferably suggested that the bellow includes a pressure port, adapted to receive the gaseous medium for pneumatically charging the bellow into its pressurized state. In particular, the pressure port is adapted to pneumatically connect the bellow to a charging line, in particular a compressor line of the housing structure. A bellow with such pressure port can advantageously be charged by the application of pressurized air, which in particular is available from the compressor assembly mounted by the bearing. Because of the constant availability of pressurized air, the bellow can be re-charged, for example in case of a pressure loss, for maintaining the damping function of the bellow long-term.

It is preferably suggested that the fixation feature includes
- a hollow cylindrical body with a threaded surface, adapted to engage with a corresponding bearing thread of the housing structure, and
- the hollow cylindrical body is adapted to hold the bellow via a clamped and/or positively locking fixation. Such a hollow cylindrical body constitutes an advantageous constructive solution for fixing the bellow to the housing structure as well as for providing a pressure port, in particular a gas passage to an inner bellow space, for charging the bellow. For attaching the bellow to the hollow cylindrical body, the hollow cylindrical body can feature a flange, web or the like radially or axially extending thin-walled portion, that can be plastically deformed during assembly for permanently clamping and thus holding the bellow skin in place.

Preferably, a valve is proposed, adapted to pneumatically close and open the pressure port and/or the pneumatic connection between the charging line and the bellow. With such a valve, the charging of the bellow can be controlled. Also a de-charging, for example in case of a replacement of the compressor assembly, can be achieved by opening the valve prior to disassembly, allowing the pressurized air to escape the inner bellow space.

It is preferably suggested that the valve is a check valve, adapted to open in a flow direction from the charging line to the bellow, and to close in the opposite direction. With such check valve, it is ensured that pressurized air, when available, is always directed into the inner bellow space, but cannot escape the inner bellow space because of the locking function of the check valve in the opposite flow direction.

Preferably, the bellow can be made of rubber. Rubber has the advantage of being a widely available construction material with well known properties. In particular, the flexible mechanical properties, that is, its elastic flexibility, make rubber particularly suitable for an application in an air spring bellow.

It is preferably suggested that the bellow is rotationally symmetric.

Preferably, the mounting feature can include a rotationally symmetric recess, in particular coaxially aligned with the bellow. Such rotationally symmetric recess, and/or a rotationally symmetric bellow, lead to a relatively simple geometry of the bellow and thus make it easy to manufacture. In embodiments where the mounting feature includes a recess which is coaxially aligned with the bellow, the force resulting from the mounting of the compressor assembly is advantageously introduced into the bellow in a center region, in particular at the center of gravity of the bellow.

In a second aspect, the disclosure leads to an air supply unit for a vehicle, including
- a compressor assembly according to the first aspect of the disclosure,
- a housing structure with at least one mounting receptacle adapted to receive the at least one bellow bearing.

In accordance with a further embodiment of the air supply unit, it is proposed that the housing structure includes a charging line, in particular a compressor line, adapted to pneumatically connect a pressure outlet, in particular of the compressor assembly, to the pressure port of the bellow bearing. With such charging line, the bellow can be charged by an integrated pressure line, without the need for any further pressure line and/or further installation effort.

In accordance with a further embodiment of the air supply unit, it is proposed that a valve is located in the charging line, wherein the valve is adapted to pneumatically close and open the pressure port and/or the pneumatic connection between the charging line and the bellow. By being integrated into the charging line, such valve function can be realized without further increasing the complexity of the bearing and/or bellow itself. Therefore, the bearing could be exchanged without exchanging the valve. Also, prior to a disassembly of the bearing, the supply of pressurized air can be conveniently blocked through the valve in the charging line.

In accordance with a further embodiment of the air supply unit, it is proposed that the housing structure is a cast structure. A cast structure, due to its manufacturing process, allows for a relatively easy integration of a charging line inside the structure via casting, in particular without any drilling.

BRIEF DESCRIPTION OF DRAWINGS

The invention will now be described with reference to the drawings wherein.

DETAILED DESCRIPTION

Figure 1A:
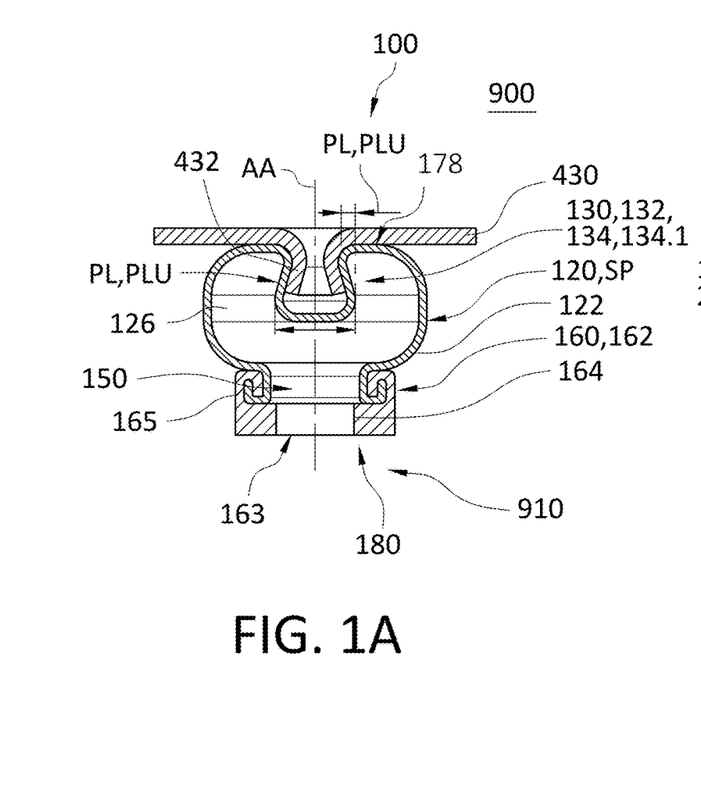
FIG. 1A and FIG. 1B show two illustrations of a first embodiment of the disclosure with a positively locking mounting feature and a pressure port.

FIG. 1A shows a bearing 100 of a compressor assembly 400 according to the concept of the disclosure. The bearing 100 includes a bellow 120, adapted to mechanically connect, in particular to fix in a damping manner, a mounting bracket 430 of a compressor housing 420 to a (not shown) housing structure 910 of an air supply unit 900. The bearing 100 includes a fixation feature 160 in the form of a hollow cylindrical body 162. The hollow cylindrical body 162 includes in its center a cylindrical gas passage 163, adapted to pneumatically connect an inner bellow space 126 of the bellow 120 to a charging line 940, in particular a compressor line 942, of the air supply unit 900. For such pneumatic connection, the bellow 120 includes a pressure port 150 on a second, supply unit-side bellow end face 180, which is located at the gas passage 163 of the fixation feature 160. A bellow skin 122 of the bellow 120 is held by the fixation feature 160, here the hollow cylindrical body 162, via clamping. For this, a rotationally symmetrical web 165 of the hollow cylindrical body 162 is bent inwards in order to engage with and/or positively lock and/or force close the bellow skin 122.

The bellow 120 is rotationally symmetrical with respect to an axial direction AA. On a compressor-side bellow end face 178, located opposite of the supply unit-side bellow end face 180, the bellow 120 includes a mounting feature 130.

The mounting feature 130 is adapted to receive a radially and outwardly extending mounting shoulder 432 of the mounting bracket 430. Particularly when the bellow 120 is in an unpressurized state SU, the mounting shoulder 432 can be inserted into the mounting feature 130, which here includes a recess 132 in the form of a rotationally symmetric recess 134. In the shown embodiment, the rotationally symmetric recess 134 has the shape of a negative frustoconical recess 134.1. By applying a pressure to the inner bellow space 126 through the charging line 940, the bellow 120 can be charged from its unpressurized state SU to a pressurized state SP. In the pressurized state SP, the flexibility of the bellow 120 decreases due to the increased pressure inside and the shape of the bellow 120 is stiffened as a consequence. Due to the shape of the negative frustoconical recess 134.1, in particular the fact that a recess diameter DR increases towards the inside of the bellow 120, and a corresponding shape of the mounting shoulder 432, the mounting shoulder 432 will be positively locked in the rotationally symmetric recess 134 once the bellow 120 is charged to its pressurized state SP.

Figure 1B:
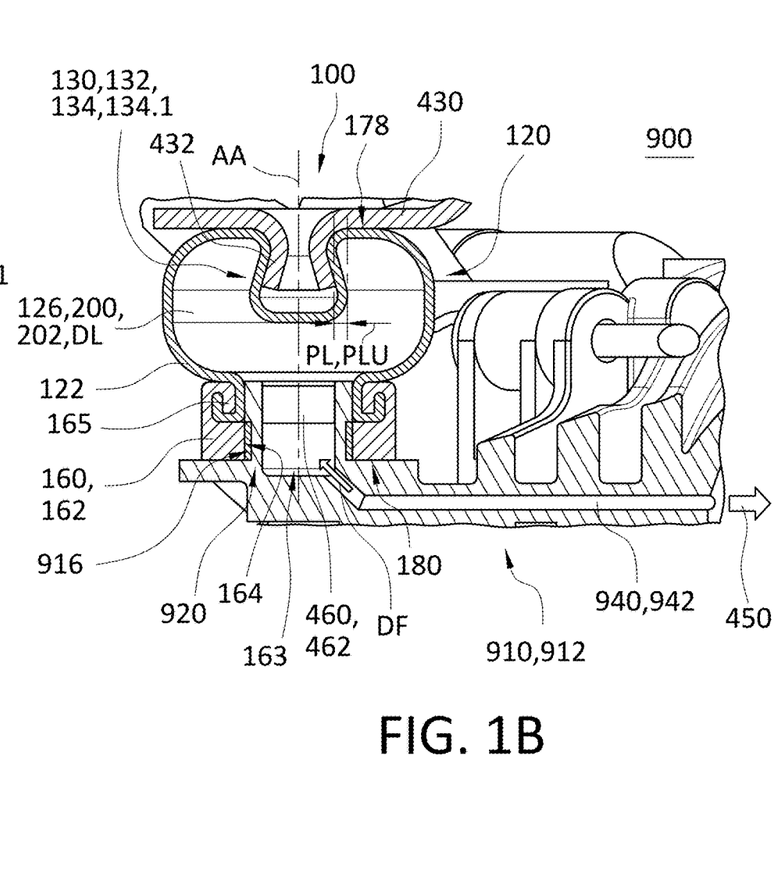

FIG. 1B shows a bearing 100 similar to the one shown in FIG. 1A. The bearing 100 is shown in a mounted state, mechanically connected to a housing structure 910 of an air supply unit 900. The mechanical connection is established there via threaded surface 164 of the hollow cylindrical body 162 engaging with a bearing thread 916 of the housing structure 910, wherein the bearing thread 916 is located at a mounting receptacle 920 of the housing structure 910. The housing structure 910 further includes a charging line 940, wherein the charging line 940 is pneumatically connected to the inner bellow space 126 via the mounting receptacle 920 for charging the bellow 120 from an unpressurized state SU to a pressurized state SP. The charging line 940 can particularly be a compressor line 942, pneumatically connecting the inner bellow space 126 to a pressure outlet 450 of the compressor 410. Via such compressor line 942, the bellow 120 can be charged from an unpressurized state SU into its pressurized state SP directly by the compressor 410 of the air supply unit 900, mounted by the bearing 100. The inner bellow space 126 is filled with a gaseous medium 200, in particular air 202, flowing in a flow direction DF from the charging line 940 to the inner bellow space 126. In particular, the air 202 can be provided by the compressor 410 in form of pressurized air DL. The housing structure 910, in particular a mounting receptacle 920, or the bearing 100, in particular the hollow cylindrical body 162 and/or the pressure port 150, can include a valve 460 for controlling the flow of the gaseous medium 200 into the inner bellow space 126 or out of it. In particular, the valve 460 can be a check valve 462, allowing a flow of the gaseous medium 200 in the flow direction DF, and blocking the flow in the opposite direction.

Figures 2, 3A, 3B:
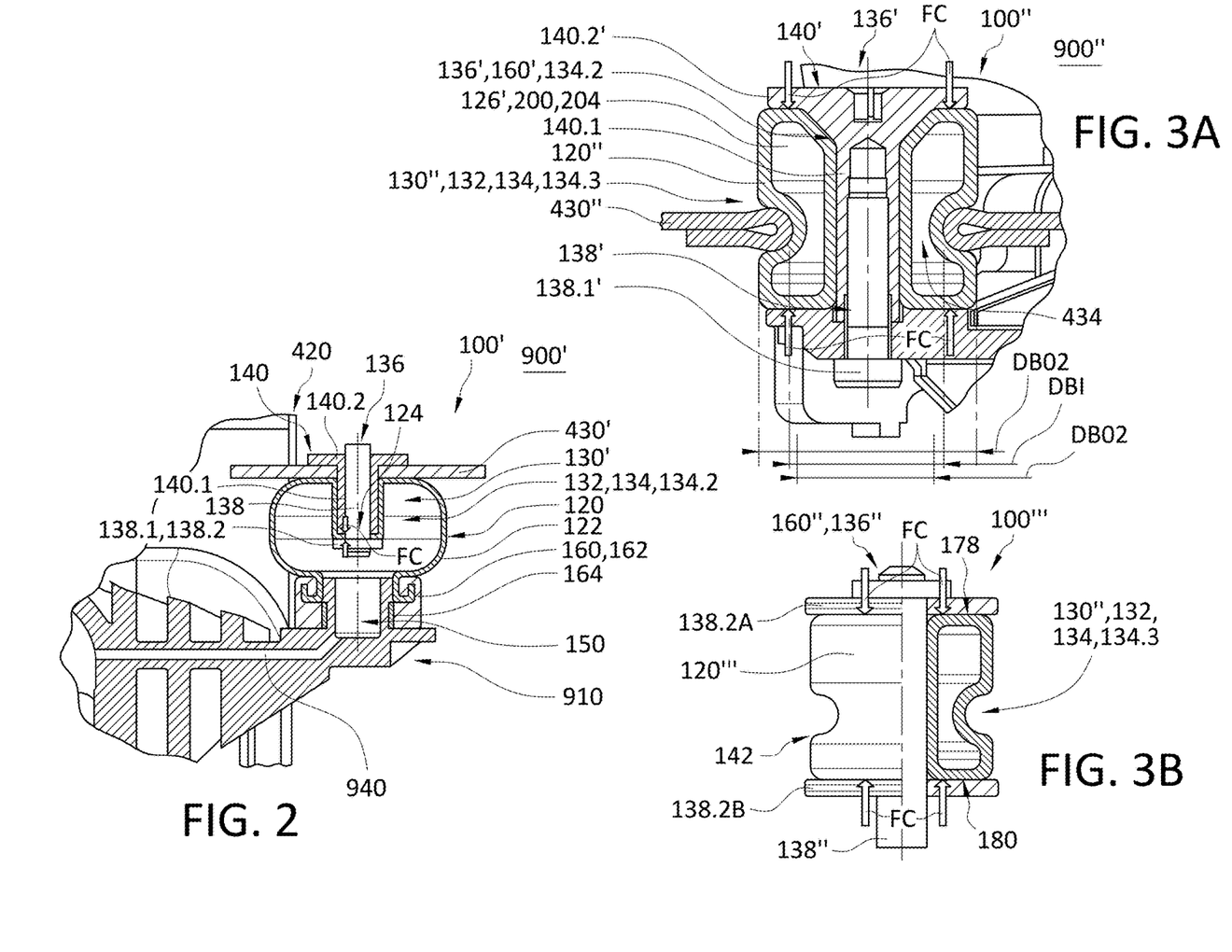
FIG. 2 shows an illustration of a second embodiment of the disclosure with a mounting assembly and a pressure port.
FIG. 3A and FIG. 3B show illustrations of a third and fourth embodiment of the disclosure with an air tight bellow and a mounting assembly; and, FIG. 4A, FIG. 4B and FIG. 4C show a schematic mounting sequence.

FIG. 2 shows a second embodiment of a bearing 100' according to the concept of the disclosure. As a difference to the previously shown embodiment in FIG. 1A and FIG. 1B, the mounting feature 130' of a bellow 120' of the bearing 100' includes a recess 132' in the form of a rotationally symmetric recess 134, in particular a cylindrical recess 134.2. The mounting feature 130' further includes a mounting assembly 136 with a mounting screw 138 and a mounting nut 140. The mounting assembly 136 establishes a mechanical connection between the bellow 120' and the mounting assembly 136 via clamping, by tightening the mounting screw 138 to the mounting nut 140 and therefore exerting a compression force FC onto the bellow skin 122. For establishing the mechanical connection, the mounting screw 138 is first inserted through the pressure port 150 of the bearing 100' in an unmounted state, and further through a clamping orifice 124. The mounting screw 138 includes a screw head 138.1 and/or a washer 138.2 with a diameter greater than the diameter of the clamping orifice 124. The mounting nut 140 includes a hollow cylindrical shaft 140.1 with an inner thread adapted to engage with the mounting screw 138 such that, in a fastened state of the mounting assembly 136, the bellow skin 122 of the bellow 120 is clamped tightly in between the screw head 138.1 or washer 138.2 and the shaft 140.1.

After mounting of the mounting assembly 136 and before charging the bellow 120', the mounting bracket 430' is held loosely between the mounting nut 140 and the bellow 120'. The axial dimension of the mounting nut 140 along the axial direction AA as well as the axial dimension of the recess 132 of the bellow 120' is selected such that the bellow 120', upon being charged in its pressurized state SP, will firmly press the mounting bracket 430' against the mounting nut 140, establishing a positive locking of the mounting bracket 430'. The charging of the bellow 120' can be achieved via a charging line 940, analogously to the previously shown embodiment.

In alternative embodiments, the hollow cylindrical shaft 140.1 of the mounting nut 140 can be separate from the mounting nut 140 as a single part or also can be attached to the mounting bracket 430'.

In various embodiments, in particular where a mounting assembly 136' is part of the fixation feature 160 of an air tight bellow 120", the hollow cylindrical shaft 140.1 of a mounting nut 140' can be of a defined axial length which limits the extent to which the mounting screw 138' can be fastened and thus defines a minimum axial extension of the bellow 120".

FIG. 3A shows a third embodiment of the bearing 100" according to the concept of the disclosure. The bearing 100" includes a bellow 120" which is airtight and therefore does not includes a pressure port or the like gas passage. An inner bellow space 126' is filled with a gaseous medium 200, in particular an inert gas 204. An inert gas 204 has the advantage of reducing temperature influences to the bellow, in particular increasing the resistance to freezing.

The bellow 120" includes a mounting feature 130", which includes a recess 132 in the form of an outer circumferential recess 134.3 and is adapted to receive a mounting bracket 430" of a compressor assembly 400. The outer circumferential recess 134.3 is adapted to hold the mounting bracket 430" in a positively locking manner when the bellow 120" is in its pressurized state SP.

A fixation feature 160' includes a mounting assembly 136', wherein the mounting assembly 136' includes a mounting screw 138' and a mounting nut 140'. The fixation feature 160' further includes a rotationally symmetric recess 134 in the form of a cylindrical through hole 134.4. The cylindrical through hole 134.4 is adapted to receive the mounting assembly 136' in order to mechanically connect, in particular fix, the bellow 120" to a mounting receptacle 920 of a housing structure 910 of an air supply unit 900. The mounting assembly 136' is further adapted to charge the bellow 120" from an unpressurized state SU to a pressurized state SP by fastening the mounting nut 140' to the mounting screw 138' and thus compressing the bellow 120" by reducing the axial distance between the mounting nut 140', in particular a mounting nut flange 140.2, and the mounting screw 138', in particular a mounting screw head 138.1. In this embodiment, the concept of pneumatically charging the bellow 120" is realized by a mechanical compression imposed on the bellow 120" in the form of a compression force FC by the mounting assembly 136', achieved by fastening the mounting assembly 136.

In its unpressurized state SU of the bellow 120", an unpressurized outer bellow diameter DBO1 is equal to or smaller than an inner bracket diameter DBI of a bracket orifice 434 of the mounting bracket 430", such that the bellow 120" can be inserted into the bracket orifice 434. In some embodiments, the unpressurized outer bellow diameter DBO1 can also be slightly greater than the inner bracket diameter DBI, as long as, due to the flexibility of the bellow 120", it can be inserted into the bracket orifice 434. Upon charging, in its pressurized state SP, the bellow 120", due to the axial compression, increases its diameter to a pressurized outer bellow diameter DBO2, which is greater than the inner bracket diameter DBI. As a consequence of the compression and the diameter increase, the outer circumferential recess 134.3 forms out and the bellow 120" holds the mounting bracket 430 in a positively locking manner due to the shape of the outer circumferential recess 134.3.

FIG. 3B shows a fourth embodiment of a bearing 100''' which differs from the third embodiment in particular in that a mounting assembly 136" of a fixation feature 160" includes a first mounting screw washer 138.2A and a second mounting screw washer 138.26.

A mounting screw 138" includes a mounting screw head 138.1' and is adapted to directly engage with a thread of a mounting receptacle 920' (not shown) of a housing structure 910 of an air supply unit 900.

Both mounting screw washers 138.2A, 138.2B feature a washer diameter DW which is equal to or greater than a pressurized outer bellow diameter DBO2 of the bellow 120'''. With such washer diameter DW, the first mounting screw washer 138.2A completely covers a first, upper bellow end face 178' and the second mounting screw washer 138.2B completely covers a second, supply unit—side bellow end face 180' of the bellow 120'''. With such mounting screw washers 138.2A, 138.2B, the compression force FC exerted on the bellow 120''' by the mounting assembly 136" can be equally distributed across the complete bellow end faces 178', 180' when the bellow 120''' is pneumatically charged by fastening the mounting assembly 136". Such mounting screw washers can also be applied in other embodiments, for example, the one shown in FIG. 3A, for achieving a more equal force distribution, and are particularly advantageous for embodiments including an air tight bellow.

A mounting feature 130, 130', 130" can include a feature marking 142 as a means of guidance for the assembly process. In the shown embodiment, the feature marking 142 of the outer circumferential recess 134.3 includes a colored circumferential zone which has to be brought into alignment with a bracket orifice (not shown here, see, for example, FIG. 3A) prior to charging the bellow 120''' into its pressurized state SP.

Figure 4A:
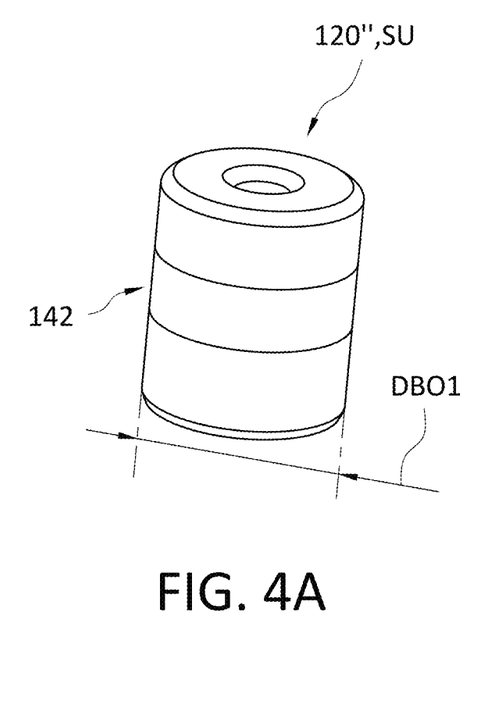
Figure 4B:
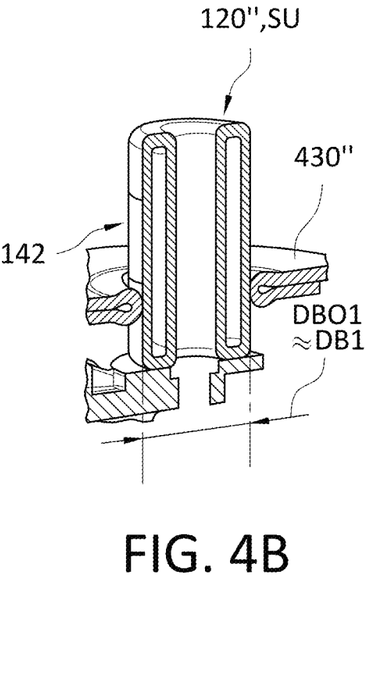
Figure 4C:
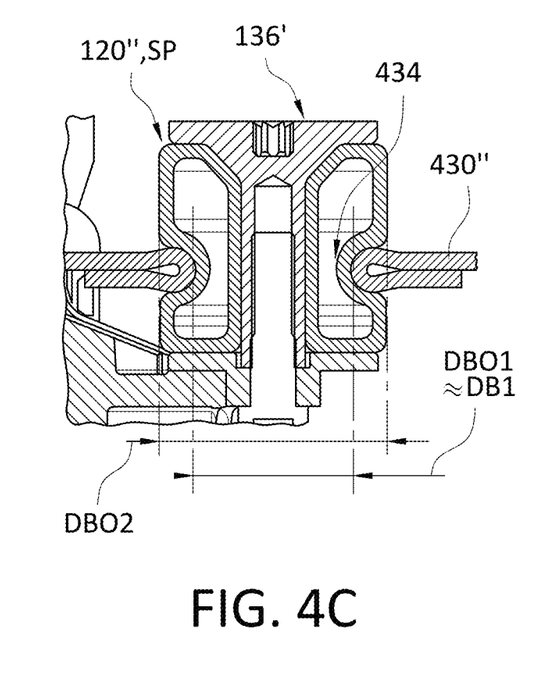

FIGS. 4A to 4C demonstrate the process of assembling a bearing according to the concept of the disclosure with an airtight bellow 120". In FIG. 4A, the bellow 120" is shown in its unassembled and unpressurized state SU, featuring an outer bellow diameter DBO1. FIG. 4B shows the process of inserting the bellow 120" into a bracket orifice 434 of a mounting bracket 430". Once the bellow 120" is inserted such that a feature marking 142 is aligned with the mounting bracket 430, a mounting assembly 136' can be inserted into the bellow 120 and can be fastened in order to charge the bellow 120" from an unpressurized state SU into a pressurized state SP, as shown in FIG. 4C.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

100, 100', 100", 100''' bearing
120, 120', 120", 120''' bellow
122 bellow skin
124 clamping orifice
126, 126' inner bellow space
128 rubber
130, 130', 130" mounting feature
132, 132' recess
134 rotationally symmetric recess
134.1 negative frustoconical recess
134.2 cylindrical recess
134.3 outer circumferential recess
136, 136', 136" mounting assembly
138, 138' mounting screw
138.1, 138.1' mounting screw head
138.2, 138.2' mounting screw washer
140, 140' mounting nut
140.1 hollow cylindrical shaft of the mounting nut
140.2 mounting nut flange
140.3 mounting nut washer
142 feature marking
150 pressure port
160, 160', 160" fixation feature
162 hollow cylindrical body
163 gas passage
164 threaded surface of hollow cylindrical body
165 rotationally symmetrical web
166 fixation bore
168 fixation assembly
170 fixation screw
172 fixation nut
174 washer, compressor-side washer
176 washer, supply unit-side washer
178, 178' first bellow end face, compressor-side bellow end face
180, 180' second bellow end face, supply unit-side bellow end face
200 gaseous medium
202 air
204 inert gas
400 compressor assembly
410 compressor
420 compressor housing
430, 430', 430" mounting bracket
432 mounting shoulder
434 bracket orifice
450 pressure outlet
460 valve
462 check valve
900 air supply unit
910 housing structure of the air supply unit
912 cast structure
916 bearing thread of the housing structure
920 mounting receptacle
940 charging line of the housing structure
942 compressor line of the housing structure
1000 vehicle
AA axial direction
DBI inner bracket diameter
DBO1 unpressurized outer bellow diameter
DBO2 pressurized outer bellow diameter
DF flow direction from the charging line to the bellow
DL pressurized air
DR recess diameter
FC compression force
FL force closure
PL positive lock
PLU undercut
SP pressurized state
SU unpressurized state

The invention claimed is:

1. A compressor assembly for an air supply unit of a vehicle, the compressor assembly comprising:
   a compressor configured to provide pressurized air and having a compressor housing;
   at least one mounting bracket fixed to said compressor housing;
   at least one bearing, wherein, for each of said at least one mounting brackets, the compressor assembly has one of said at least one bearings for connecting the compressor assembly to a housing structure of the air supply unit;
   said at least one bearing includes a flexible, hollow bellow configured to receive a gaseous medium;
   said flexible, hollow bellow includes at least one mounting feature configured to receive said at least one mounting bracket;
   said bellow being configured to be pneumatically charged from an unpressurized state into a pressurized state; and,
   said at least one mounting feature being configured to mechanically connect said bellow to said at least one mounting bracket in the pressurized state via a positive lock.

2. The compressor assembly of claim 1 further comprising a fixation feature configured to mechanically connect said bellow to the housing structure of the air supply unit.

3. The compressor assembly of claim 1 further comprising:
   a mounting assembly having a mounting screw configured to exert an axial compression force to said bellow or a bellow skin of said bellow via a fastening of said mounting screw.

4. The compressor assembly of claim 3 further comprising:
   a fixation feature configured to mechanically connect said bellow to the housing structure of the air supply unit; and,
   said mounting assembly being part of said fixation feature and being configured to charge said bellow from the unpressurized state into the pressurized state.

5. The compressor assembly of claim 3, wherein said mounting assembly is part of said at least one mounting feature and is configured to clamp said bellow skin via a force closure of said bellow skin at a clamping orifice located in said at least one mounting feature.

6. The compressor assembly of claim 3, wherein said mounting assembly includes at least one mounting screw washer configured to distribute the compression force on said bellow.

7. The compressor assembly of claim 1, wherein said bellow is air tight.

8. The compressor assembly of claim 1, wherein said bellow includes a pressure port configured to receive the gaseous medium for pneumatically charging said bellow into the pressurized state.

9. The compressor assembly of claim 2, wherein said fixation feature includes a hollow cylindrical body having a threaded surface and configured to engage with a corresponding bearing thread of the housing structure; and, said hollow cylindrical body is configured to hold said bellow via at least one of a clamped fixation and positively locking fixation.

10. The compressor assembly of claim 8 further comprising a valve configured to pneumatically close and open at least one of said pressure port and a pneumatic connection between a charging line and said bellow.

11. The compressor assembly of claim 10, wherein said valve is a check valve configured to open in a flow direction from the charging line to said bellow and to close in a direction opposite to the flow direction.

12. The compressor assembly of claim 1, wherein said bellow is comprised of rubber.

13. The compressor assembly of claim 1, wherein said at least one mounting feature is a recess.

14. The compressor assembly of claim 1 further comprising a mounting assembly having a mounting screw and a mounting nut configured to exert an axial compression force to said bellow or a bellow skin of said bellow via a fastening of at least one of said mounting screw and said mounting nut.

15. The compressor assembly of claim 3, wherein said mounting assembly includes at least one mounting screw washer configured to distribute the compression force on a bellow end face of said bellow.

16. The compressor assembly of claim 3, wherein said mounting assembly is part of said at least one mounting feature and is configured to sealingly clamp said bellow skin via a force closure of said bellow skin at a clamping orifice located in said at least one mounting feature.

17. An air supply unit for a vehicle, the air supply unit comprising:
a housing structure;
a compressor assembly including a compressor configured to provide pressurized air and having a compressor housing;
said compressor assembly further comprising at least one mounting bracket fixed to said compressor housing and at least one bearing;
wherein, for each of said at least one mounting brackets, the compressor assembly has one of said at least one bearings for connecting the compressor assembly to said housing structure;
said at least one bearing includes a flexible, hollow bellow configured to receive a gaseous medium;
said flexible, hollow bellow includes at least one mounting feature configured to receive said at least one mounting bracket;
said bellow being configured to be pneumatically charged from an unpressurized state into a pressurized state;
said at least one mounting feature being configured to mechanically connect said bellow to said at least one mounting bracket in the pressurized state via a positive lock; and,
said housing structure having at least one mounting receptacle configured to receive said at least one bellow bearing.

18. The air supply unit of claim 17, wherein said housing structure includes a charging line configured to pneumatically connect a pressure outlet to a pressure port of said at least one bearing.

19. The air supply unit of claim 17, wherein said housing structure includes a compressor line configured to pneumatically connect a pressure outlet of said compressor assembly to a pressure port of said at least one bearing.

20. The air supply unit of claim 18 further comprising a valve disposed in said charging line; and, said valve being configured to pneumatically close and open at least one of said pressure port and a pneumatic connection between said charging line and said bellow.

* * * * *

UNITED STATES PATENT AND TRADEMARK OFFICE
CERTIFICATE OF CORRECTION

PATENT NO. : 12,270,446 B2
APPLICATION NO. : 18/177542
DATED : April 8, 2025
INVENTOR(S) : Katarzyna Golda Page 1 of 1

It is certified that error appears in the above-identified patent and that said Letters Patent is hereby corrected as shown below:

In the Specification

In Column 8:
Line 19: delete "138.26" and substitute -- 138.2B -- therefor.

Signed and Sealed this
Fourth Day of November, 2025

John A. Squires
*Director of the United States Patent and Trademark Office*